United States Patent
Bender

(10) Patent No.: US 11,939,061 B2
(45) Date of Patent: Mar. 26, 2024

(54) VEHICLE

(71) Applicant: Dr. Ing. h.c. F. Porsche Aktiengesellschaft, Stuttgart (DE)

(72) Inventor: Stefan Bender, Loechgau (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 85 days.

(21) Appl. No.: 17/549,909

(22) Filed: Dec. 14, 2021

(65) Prior Publication Data

US 2022/0185479 A1 Jun. 16, 2022

(30) Foreign Application Priority Data

Dec. 15, 2020 (DE) ...................... 10 2020 133 448.6

(51) Int. Cl.
*B60R 11/02* (2006.01)
*B64D 11/00* (2006.01)

(52) U.S. Cl.
CPC .... *B64D 11/00151* (2014.12); *B60R 11/0235* (2013.01); *B64D 11/00155* (2014.12); *B60R 2300/8006* (2013.01)

(58) Field of Classification Search
CPC ........ B64D 11/00151; B64D 11/00155; B60R 11/0235; B60R 2300/8006
See application file for complete search history.

(56) References Cited

U.S. PATENT DOCUMENTS

| | | | | |
|---|---|---|---|---|
| 8,308,237 | B2 * | 11/2012 | Kunou | B60R 11/0235 297/217.3 |
| 10,017,117 | B2 * | 7/2018 | Lewis | B60R 1/00 |
| 11,541,825 | B2 * | 1/2023 | Brouwer | B60R 11/02 |
| 2016/0082888 | A1 * | 3/2016 | Kothari | B60R 11/0235 348/148 |
| 2017/0054949 | A1 | 2/2017 | Shaw | |
| 2017/0101183 | A1 | 4/2017 | Wilhelm | |
| 2017/0274825 | A1 * | 9/2017 | Woodhouse | H04N 23/661 |
| 2017/0347067 | A1 * | 11/2017 | Bostrom | H04N 5/2628 |
| 2019/0102635 | A1 * | 4/2019 | Yamamoto | B60R 1/00 |
| 2020/0223362 | A1 * | 7/2020 | Witte | H04N 7/188 |

FOREIGN PATENT DOCUMENTS

DE 102015117401 A1 4/2017

* cited by examiner

*Primary Examiner* — Philip F Gabler
(74) *Attorney, Agent, or Firm* — LEYDIG, VOIT & MAYER, LTD.

(57) ABSTRACT

A vehicle includes an occupant space and seats for occupants. The seats are arranged, viewed in a travel direction of the vehicle, one behind the other in the occupant space. The vehicle also includes an image capturing device configured to capture an image of a respective seat and/or an occupant sitting in the respective seat, and a display device configured to display an image captured by the image capturing device in a region of another seat and/or in a field of view of an occupant sitting in the other seat.

15 Claims, 2 Drawing Sheets

VEHICLE

CROSS REFERENCE TO RELATED APPLICATIONS

This application claims benefit to German Patent Application No. DE 10 2020 133 448.6, filed on Dec. 15, 2020, which is hereby incorporated by reference herein.

FIELD

The present disclosure relates to a vehicle, in particular to an aircraft or a passenger motor vehicle.

BACKGROUND

An aircraft or a passenger motor vehicle can have a plurality of seats for occupants. Such vehicles can have both seats in which occupants sit next to one another and also seats in which occupants sit behind one another.

If occupants of a vehicle sit in seats that are arranged behind one another, the common travel experience is limited.

DE 10 2015 117 401 A1 discloses an aircraft cabin arrangement. The aircraft cabin arrangement comprises a cabin interior wall delimiting a cabin interior space, wherein seats for occupants are arranged in the cabin interior space. It is proposed that a cabin wall of the aircraft cabin arrangement has a wall surface, wherein a holographic recording of an object is provided on the wall surface.

SUMMARY

In an embodiment, the present disclosure provides a vehicle. The vehicle includes an occupant space and seats for occupants. The seats are arranged, viewed in a travel direction of the vehicle, one behind the other in the occupant space. The vehicle also includes an image capturing device configured to capture an image of a respective seat and/or an occupant sitting in the respective seat, and a display device configured to display an image captured by the image capturing device in a region of another seat and/or in a field of view of an occupant sitting in the other seat.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
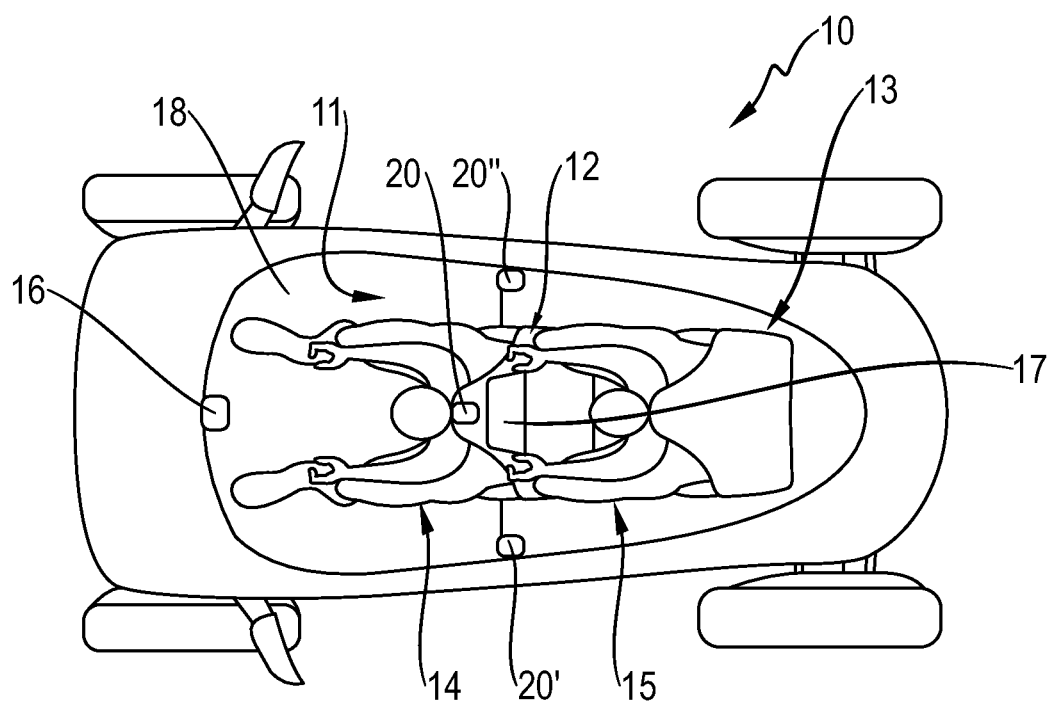
FIG. 1 shows a top view of a vehicle according to the invention in the form of a passenger motor vehicle.

The present disclosure provides a novel vehicle.

The vehicle according to the present disclosure has at least one image capturing device for capturing a seat and/or an occupant sitting in that seat. The vehicle furthermore has at least one display device for displaying an image captured by the image capturing device in the region of another seat and/or in the field of view of an occupant sitting in the other seat.

The vehicle preferably has a first image capturing device for image-side capturing a first seat and/or a first occupant sitting in the first seat, furthermore has a first display device for displaying the captured image of the first seat and/or of the first occupant sitting in the first seat in the region of a second seat and/or in the field of view of a second occupant sitting in the second seat, wherein the second seat and thus the second occupant is situated behind the first seat and thus behind the first occupant.

The vehicle alternatively or additionally has a second image capturing device for image-side capturing the second seat and/or the second occupant sitting in the second seat, furthermore has a second display device for displaying the captured image of the second seat and/or of the second occupant sitting in the second seat in the region of a first seat and/or in the field of view of a first occupant sitting in the first seat, wherein the first seat and thus the first occupant is situated in front of the second seat and thus in front of the second occupant.

The present disclosure proposes for the first time to capture a seat and thus an occupant sitting in the seat via an image capturing device and to display the captured image on a display device for another occupant. In this way, the common travel experience can be enhanced. In particular, it is possible to virtually create or impart the impression of sitting next to one another for occupants sitting behind one another in the vehicle.

Preferably, at least one display device, in particular the second display device, is a projector, wherein a see-through projection surface interacts with the projector. At least one other display device, in particular the first display device, is preferably a screen.

A display device in the form of a projector is used in particular if the former is intended to display for the driver or pilot of the vehicle an image of an occupant sitting behind said driver or pilot. In this case, the projector can be set up like a head-up display and use, as the projection surface, a see-through projection surface, in particular a window of the vehicle. In this way, the driver or pilot can then perceive the occupant sitting behind them without the need to change their viewing direction. A projector can also be used as a display device for the occupant sitting behind.

However, it is also possible to use screens as display devices. A screen can be used in particular if the image of the driver or pilot, that is to say of an occupant sitting in front, is to be displayed to an occupant sitting behind. Such a screen can simply be arranged in the region of a backrest positioned in front of the occupant and thus in front of the seat accommodating the occupant.

According to an advantageous development, the vehicle has a first sound capturing device for acoustically capturing the region of the first seat and/or the first occupant sitting in the first seat, furthermore has a first sound reproduction device for reproducing sounds captured via the first sound capturing device in the region of the second seat and/or the second occupant. The vehicle alternatively or additionally has a second sound capturing device for acoustically capturing the region of the second seat and/or the second occupant sitting in the second seat, furthermore has a second sound reproduction device for reproducing sounds captured via the second sound capturing device in the region of the first seat and/or the first occupant. Furthermore, with this development, communication between vehicle occupants sitting behind one another can be supported.

Preferred developments will emerge from the description below. Exemplary embodiments will be explained in more detail on the basis of the drawings, without being restricted thereto.

The disclosure relates to a vehicle having an occupant space, wherein seats for occupants are arranged in the occupant space at least one behind the other. Such a vehicle can be an aircraft or a passenger motor vehicle. In the case of an aircraft, the aircraft can be for example a glider, a vertical takeoff aircraft, or the like.

Embodiments of the disclosure will be described below for a vehicle in the form of a passenger motor vehicle with reference to FIGS. 1 to 3.

FIG. 1 shows a top view of a passenger motor vehicle 10 having an occupant space 11, wherein, in the exemplary embodiment shown, two seats 12, 13 are arranged one behind the other in the occupant space 11. A first occupant 14 can be seated in a first seat 12 and a second occupant 15 can be seated in a second seat 13. Viewed in the travel direction of the vehicle 10, the second seat 13 is in this case arranged behind the first seat 12. In the exemplary embodiment shown, the first seat is a driver seat and the second seat 13 is a passenger seat.

The disclosure is not limited to a vehicle having two such seats. Rather, the disclosure can also be used in a vehicle that has a plurality of seats that are arranged one next to the other and a plurality of seats that are arranged one behind the other. For example, the vehicle can have two front seats, arranged one next to the other, and two rear seats, arranged one next to the other and behind the front seats. It is also possible for there to be more than two rows of seats. As has already been stated above, the disclosure is likewise not limited to a passenger motor vehicle. Rather, the disclosure can also be used in an aircraft, such as for example in a glider or a vertical takeoff aircraft.

The vehicle 10 has at least one first image capturing device 16 for capturing the first seat 12 and thus the first occupant 14 sitting in the first seat 12. The vehicle 10 furthermore has a first display device 17 for displaying the image of the first seat 12 and thus of the first occupant 14 sitting in the first seat 12 in the region of the second seat 13 and thus in the field of view of the second occupant 15 sitting in the second seat 13.

Viewed in the transverse direction of the vehicle, in FIG. 1, the first image capturing device 16 is located approximately at the center of what is known as a dashboard or a windshield 18 of the vehicle 10. The first display device 17 is arranged, in FIG. 1, at a backrest of the first seat 12 in the region of the second seat 13 and thus in the field of view of the second occupant 15 sitting in the second seat 13.

Figure 3:
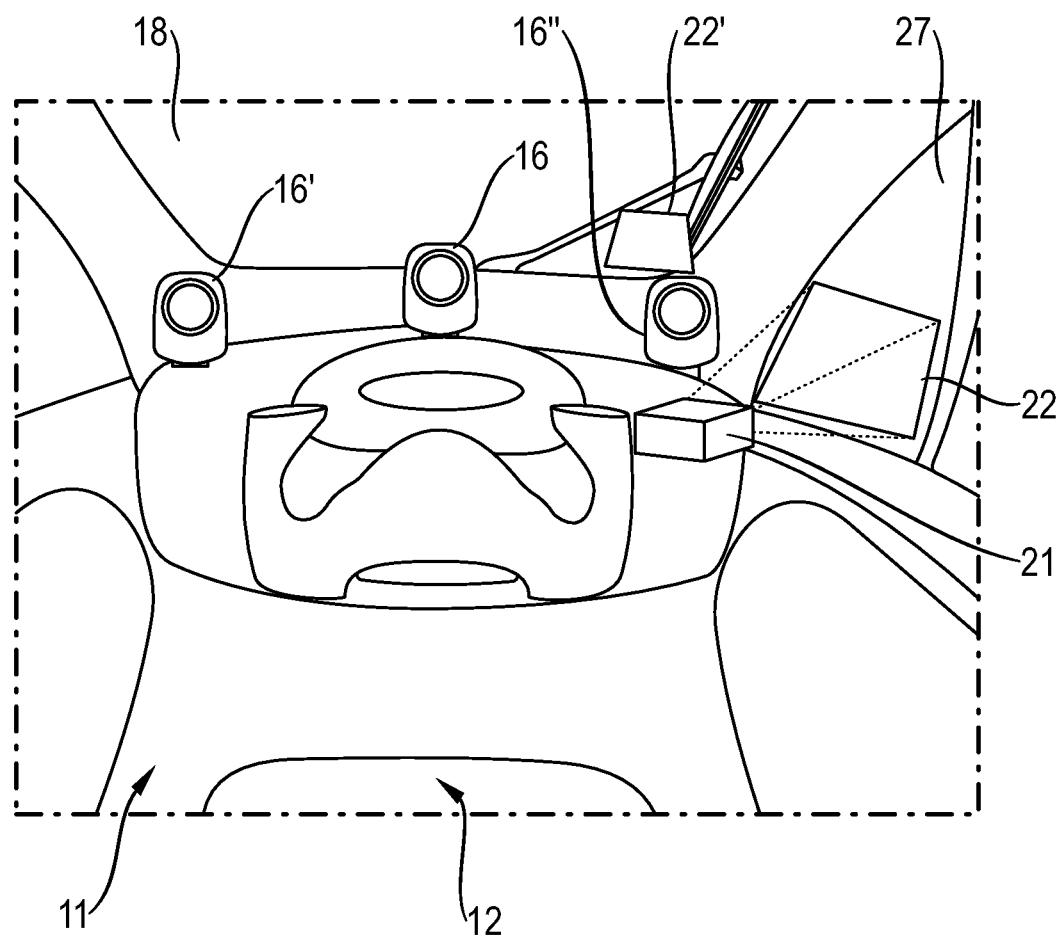
FIG. 3 shows a view from a front seat, specifically a driver seat, in the direction of the windshield of the vehicle of FIG. 1.

FIG. 3 shows a view of the windshield 18 of the motor vehicle 10 from the inside and illustrates the position of the first image capturing device 16. The reference signs 16' and 16" show further first image capturing devices or alternative positions for the first image capturing device.

The first image capturing device 16 is preferably a camera. In FIG. 1, the first display device 17 is a screen or a display.

Figure 2:
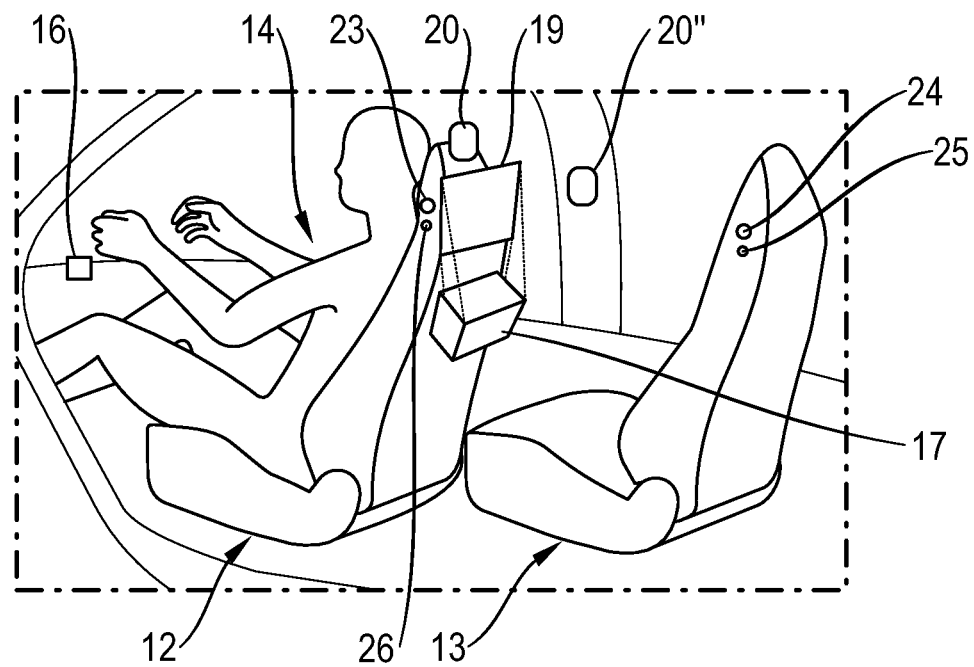
FIG. 2 shows a perspective view of seats of the vehicle of FIG. 1 arranged one behind the other.

FIG. 2 shows a modification, in which the first display device 17 is embodied in the form of a projector projecting the image to be displayed onto a projection surface 19. The projector in FIG. 2 can be embodied in the form of a 2D or 3D projector, wherein the projection surface 19 can be embodied for example as a see-through projection surface in the form of a plexiglass plate or the like.

Alternatively or additionally to the first image capturing device 16 and the first display device 17, the vehicle 10 can have a second image capturing device 20 and a second display device 21.

The second image capturing device 20 serves for capturing the second seat 13 and thus the second occupant 15 sitting in the second seat 13. The second display device 21 serves for displaying the image, captured by the second image capturing device 20, of the second seat 13 and thus of the second occupant 15 sitting in the second seat 13 in the region of the first seat 12 and thus in the field of view of the first occupant 14 sitting in the first seat 12.

In FIGS. 1 and 2, the second image capturing device 20 is arranged in the region of the rear side of a headrest of the first seat 12 and directed at the second seat 13 in order to capture the second seat 13 and thus the second occupant 15 sitting in the second seat 13.

The reference signs 20' and 20" show further second image capturing devices or alternative positions for the second image capturing device 20.

In the exemplary embodiment shown (see FIG. 3), the second display device 21 is designed as a projector projecting the image of the second occupant 15, captured with the second image capturing device 20, onto a projection surface 22, which, in FIG. 3, is provided by a section of a side window 27 of the vehicle. The projection surface 22 is accordingly a see-through projection surface.

The reference sign 22' shows an alternative position for a projection surface in the region of the windshield 18 of the vehicle 10. This position has the advantage that the driver of the vehicle 10, shown in FIGS. 1 to 3, needs to turn their viewing angle for the projection surface 22' to a lesser degree away from the road in front of the vehicle 10 than for the projection surface 22.

Consequently, it lies within the scope of the present disclosure to capture a seat 12 or 13 and thus an occupant 14 or 16 sitting in the seat 12 or 13 with the aid of at least one image capturing device 16 or 20 and to display the image thus captured to another occupant via a corresponding display device 17 or 21, wherein the occupants are occupants sitting one behind the other, specifically preferably one of the occupants is a driver or pilot of the vehicle and the other occupant is another occupant sitting behind the driver or pilot.

The respective image capturing device 16, 20 is preferably a camera. The respective display device 17 or 21 is preferably a projector or a screen.

If the respective display device 17, 21 is embodied in the form of a projector, the projector can be a 2D projector or a 3D projector, in particular a 3D hologram projector.

The respective recorded occupant can thus be displayed such that said occupant virtually sits next to the other occupant.

It is likewise possible to display a recorded occupant for the other occupant such that the recorded occupant virtually looks at the other occupant.

In an advantageous development, the vehicle 10 has a first sound capturing device 23 for acoustically capturing the region of the first seat 12 and thus the first occupant 14 sitting in the first seat 12. In this case, the vehicle then additionally has a first sound reproduction device 24 for reproducing sounds, captured via the first sound capturing device 23, in the region of the second seat 13 and thus for the second occupant 15 sitting in the second seat 13. In the exemplary embodiment shown, the first sound capturing device 23 is installed in the region of a headrest of the first seat 12. The first sound reproduction device 24 is installed in the region of a headrest of the second seat 13.

Alternatively or additionally, the vehicle 10 can have a second sound capturing device 25 for acoustically capturing the region of the second seat 13 and thus the second occupant 15 sitting in the second seat 13. In this case, a second sound reproduction device 26 is furthermore provided for reproducing sounds, captured via the second sound capturing device 25, in the region of the first seat 12 and thus the first occupant 14. In the exemplary embodiment shown, the second sound capturing device 25 is installed in the region of a headrest of the second seat 13. The second sound reproduction device 26 is installed in the region of a headrest of the first seat 12.

The respective sound capturing device 23, 25 is a microphone, and the respective sound reproduction device 24, 26 is a loudspeaker.

It is possible to enhance a travel experience of occupants sitting one behind another. To this end, at least for one occupant, an image of another occupant is captured and displayed. It is also possible additionally for acoustic communication support to be effected.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A vehicle, comprising:
   an occupant space;
   seats for occupants, which are arranged, viewed in a travel direction of the vehicle, one behind the other in the occupant space;
   an image capturing device configured to capture an image of a respective seat and/or an occupant sitting in the respective seat; and
   a display device configured to display an image captured by the image capturing device on a side window or side wall laterally adjacent to an occupant sitting in the other seat, such that the captured image is displayed in a region of another seat and/or in a field of view of the occupant sitting in the other seat.

2. The vehicle as claimed in claim 1, wherein the seats include a first seat for a first occupant and a second seat for a second occupant, wherein the second seat is arranged, viewed in the travel direction of the vehicle, behind the first seat,
   wherein the image capturing device is a first image capturing device configured to capture the first seat and/or the first occupant sitting in the first seat,
   wherein the display device is a first display device configured to display an image captured by the first image capturing device in a region of the second seat and/or in a field of view of the second occupant,
   the vehicle further comprising a second image capturing device configured to capture the second seat or the second occupant sitting in the second seat, and a second display device configured to display an image captured by the second image capturing device in a region of the first seat and/or in a field of view of the first occupant.

3. The vehicle as claimed in claim 2, further comprising:
   a first sound capturing device configured to acoustically capture the region of the first seat and/or the first occupant sifting in the first seat, and
   a first sound reproduction device configured to reproduce sounds captured via the first sound capturing device in the region of the second seat and/or the second occupant.

4. The vehicle as claimed in claim 3, wherein the first sound capturing device is a microphone.

5. The vehicle as claimed in claim 3, wherein the first sound reproduction device is a loudspeaker.

6. The vehicle as claimed in claim 3, further comprising:
   a second sound capturing device configured to acoustically capture the region of the second seat and/or the second occupant sifting in the second seat, and
   a second sound reproduction device configured to reproduce sounds captured via the second sound capturing device in the region of the first seat and/or the first occupant.

7. The vehicle as claimed in claim 1, wherein the image capturing device is a camera.

8. The vehicle as claimed in claim 1, wherein the display device is a projector or a screen.

9. The vehicle as claimed in claim 1, wherein the display device is a projector, and the projector is a 2D projector or a 3D projector.

10. The vehicle as claimed in claim 1, wherein the display device is a projector, and the vehicle further comprises a see-through projection surface that interacts with the projector.

11. The vehicle as claimed in claim 10, wherein the projection surface is a region of the side window or a different window of the vehicle.

12. The vehicle as claimed in claim 1, wherein the seats for occupants are further arranged such that no seats for occupants are laterally adjacent to another seat for another occupant.

13. The vehicle as claimed in claim 12, wherein the occupant space comprises the seats for occupants, and
    wherein the display device is further configured to display the image captured by the image capturing device within the occupant space.

14. A vehicle, comprising:
    an occupant space;
    seats for occupants, which are arranged, viewed in a travel direction of the vehicle, one behind the other in the occupant space such that no seat for an occupant is laterally adjacent to another seat for another occupant;

an image capturing device configured to capture an image of a respective seat and/or the occupant sitting in the respective seat; and a display device configured to display an image captured by the image capturing device in a region of another seat and/or in a field of view of an occupant sitting in the other seat.

15. The vehicle as claimed in claim 14, wherein the occupant space comprises the seats for occupants, and wherein the display device is further configured to display the image captured by the image capturing device within the occupant space.

\* \* \* \* \*